United States Patent Office 3,431,063
Patented Mar. 4, 1969

3,431,063
PROCESS AND COMPOSITION FOR RETARDING WATER EVAPORATION
Richard C. Fox, San Rafael, Calif., assignor to Chevron Research Company, a corporation of Delaware
No Drawing. Filed Oct. 26, 1964, Ser. No. 406,587
U.S. Cl. 21—60.5        4 Claims
Int. Cl. C09k 3/00; E03b 3/40

ABSTRACT OF THE DISCLOSURE

Composition for retarding water evaporation consisting essentially of from 70 to 99.4% by weight of a hydrocarbon oil, from 0.5 to 10% by weight of a wax and from 0.1 to 20% by weight of an alkenylsuccinic acid, anhydride, ester or amide.

---

This invention relates to a process and compositions which are effective in reducing evaporation of water. More specifically, the invention is concerned with compositions which may be applied to the surface of water and ponds, lakes and reservoirs, etc. to significantly reduce loss by evaporation.

The loss of water from open storage by evaporation is a well known problem that is becoming more serious with the world industrial growth and population boom and the consequent increased use of water for industrial, personal and farming uses. The evaporation loss is particularly high in arid, desert areas—such as the southwestern part of the United States, where water conservation is of the highest importance due to the initial scarcity of water in these low-rainfall areas. Loss of water in the United States has been estimated to be as high as 70% of the total rainfall or as much as the total required by the cities and towns of the country.

It is known that certain high molecular weight alcohols, in particular cetyl alcohol are effective as a monolayer upon water surfaces in reducing water evaporation. However, the high cots of the alcohols, the difficulty in keeping the mono-layer spread under wind conditions and the fact that certain types of bacteria are supported by the alcohols thus makes them not entirely satisfactory for this purpose. It is thus of great importance to provide compositions which will disperse easily upon water surfaces, successfully reduce evaporative loss of water, be comprised of materials of sufficiently low cost to make application of the composition to large bodies of water practicable and be resistant to destruction of the film by wind and wave action.

It has now been found that evaporation of water can be successfully retarded by the application to the water of a composition comprising from about 70%–99% by weight of a hydrocarbon oil, from 0.5–10% by weight of a wax and from 0.1–20% by weight of a surface active material such as alkenylsuccinic acids and the amide, ester and anhydride derivatives of alkenylsuccinic acids.

The hydrocarbon oils which may be employed in the composition of this invention include mineral lubricating oils such as naphthenic base and paraffinic base lubricating oils, etc. It is also desirable that the oil should not evaporate easily, therefore, it should boil predominantly above about 500° F. Particularly suitable are those oils that have an initial boiling point above 600° F. It is preferred that the oil has a viscosity of from about 50 to 500 SSU at 100° F. More viscous oils are not desirable because of difficulty encountered in spreading the films obtained.

The waxes which are employed in the composition of this invention are petroleum waxes and are more preferably paraffin waxes. Paraffin wax is a solid, crystalline, hydrocarbon mixture wholly derived from that portion of crude petroleum commonly designated paraffin distillates; from shale distillates; or from hydrocarbon synthesis, by low temperature solidification and expression or by solvent extraction. It is distinguished by its solid state at room temperature, relatively slight deformation at this temperature, even under considerable pressure, and low viscosity, from 35–45 SSU at 210° F. when melted. Preferably, the waxes are highly normal paraffinic waxes because these waxes disperse as platelets in the oil phase of the composition. The platelets are especially effective in forming a water vapor barrier. Although the paraffinic waxes are most desirable, microcrystalline waxes and mixtures of microcrystalline and paraffinic waxes may also be employed in the compositions of the invention. Natural waxes such as bees wax, etc., may also be used, however, they are somewhat less effective than the paraffinic waxes.

The surface active materials which are employed in the compositions are alkenylsuccinic anhydrides of the formula:

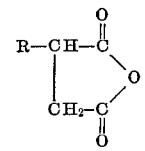

wherein R is a hydrocarbon radical having from 30 to 200 carbon atoms, preferably from about 50 to about 200 carbon atoms; alkenylsuccinic acids of corresponding structure, esters and amides of the aforementioned anhydride.

The "R" radical of the above formula, that is, the alkenyl radical, is a hydrocarbon radical having from 30–200 carbon atoms therein. The "R" radical is exemplified by olefin polymer such as propylene ploymers containing from 50 to 200 carbon atoms, and polymers of mixtures of 1-butene and isobutene having from 50 to 200 carbon atoms.

The amide- and imide-type derivatives of alkenylsuccinic anhydrides which may be employed as surfactants are the reaction products of the aforementioned alkenylsuccinic anhydrides with monamines or polyamines.

Examples of monamines which may be suitably reacted with the anhydrides to yield proper surfactants are the aliphatic monamines having from 2 to 20 carbon atoms, e.g., ethylamine, propylamine, butylamine, dodecyl or tallow amine, etc.

Examples of the polyamines which may be employed as reactants include polyalkylene polyamines such as those which are derived from polymers of ethylene and propylene and are exemplified by the formula:

wherein R represents the divalent radical ethylene or propylene, and $x$ is the number from 0 to 10 or more. Examples of these polyalkylene polyamines include diethylene triamine, triethylene tetramine, dipropylene triamine, tetraethylene pentamine, pentatethylene hexamine, nonaethylene decamine, etc.

The polyamines also include dialkylaminoalkylene amines of the formula:

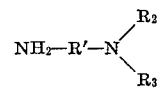

wherein R′ is a divalent alkylene radical, and $R_2$ and $R_3$ are alkyl radicals. The sum of the carbon atoms in R′, $R_2$ and $R_3$ is preferably 3 to 10; that is, R′, $R_2$ and $R_3$ contain a total of no more than 10 carbon atoms. Thus, the resulting dialkylaminoalkylamine radicals are derived from amines exemplified by dimethylaminopropyl amine, diethylaminopropyl amine, diethylaminobutyl amine, dipropylaminobutyl amine, etc.

The polyalkylene polyamines also include the aminoalkyl piperazines, which include amines of the formula:

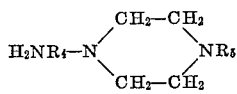

wherein $R_4$ is an alkyl radical having from 1 to 3 carbon atoms, and $R_5$ is hydrogen or an alkyl radical containing from 1 to 3 carbon atoms.

The products obtained by reacting alkenylsuccinic anhydrides and polyalkylene polyamines will be termed "N-substituted alkenyl succinimides." The N-substituted alkenyl succinimides can be prepared by reacting an alkenylsuccinic anhydride with the desired polyamine, for example, tetraethylene pentamine. The polyamine-anhydried mole ratio can be from 0.5:1 to 1:1. Preferably, the polyamineanhydride mole ratio is 0.8 to 1.

The esters which are effective as surface active materials in the composition of this invention are the lower mono and dialkyl esters of the alkenylsuccinic acids described above wherein the alkoxy groups of the esters contain from 1 to 10 carbon atoms. The esterification reaction used to produce the ester derivatives of this invention may be carried out by any commonly used method. For example, acid catalyzed esterification with alcohols or oxides, or reaction with olefins in the presence of acid catalysts such as sulphuric acid. Thus the esters may be produced by the reaction of acids with alcohols on the anhydrides with alkylene oxides.

Reaction of the anhydrides with alcohol results in the formation of a monoester or acidester in which one carboxyl radical is not esterified. Both the mono- and diesters are effective surfactants in these compositions. The surfactants are employed in amounts of from 0.1 to 20% by weight of the total composition. Amounts of from 1 to 10% by weight are preferred.

The antievaporant compositions of the invention are contacted with the surface of the water by pouring them on to the surface of the water and allowing the material to spread. The spreading may be accomplished without the aid of any supplementary agent, however, if desired, a hydrocarbon having from 5 to 10 carbon atoms may be employed to aid in the dispersal. Examples of hydrocarbons suitable for this purpose are normal pentane, normal hexane, normal octane, iso-octane, etc. Mixtures of the hydrocarbons such as petroleum distillates may be employed. When using this supplementary hydrocarbon spreading agent, it is employed in amounts of up to 60% by weight of the total composition. In dispersing the antievaporant compositions, they may be emulsified with any of the commonly known emulsifying agents and the resulting emulsion poured on to the surface of the water. Examples of emulsifying agents which may be employed are alkyl benzene sulfonates, aliphatic and aromatic quaternary amines, etc.

The following examples illustrate the methods and compositions of this invention. The examples, are, of course, only illustrative and not limiting.

EXAMPLE 1

Tricomponent compositions were prepared utilizing 2% 140/142 AMP paraffin wax, 88% of a solvent refined paraffin base lubricating oil having a viscosity of about 105 SSU at 100° F. and 10% of each additive. The additives employed were as follows:

A. Reaction product of alkenylsuccinic anhydride having approximately 65 carbon atoms in the alkenyl group with about 0.9 mole of tetraethylene pentamine.
B. Polyisobutenyl succinic anhydride having an average of about 65 carbon atoms in the alkenyl chain.

In the test, the antievaporant compositions were placed on the surface of water in a vessel wherein the surface area was 120.25 sq. in. (0.835 sq. ft.). Two controls were employed using no coating and each of the compositions was tested in other vessels. 0.1 gram of each antievaporant composition was added to the water surface. The loss of water by evaporation at the end of 7, 14 and 21 days was measured and recorded. The percentage efficiency of each antievaporant composition was calculated as:

$$\frac{100 \times \text{average change depth controls} - \text{change depth treatment}}{\text{Average change of depth of controls}}$$

Table 1 following sets forth these data:

TABLE I.—INDOOR EVAPORATION REDUCTION FROM WATER

| Treatment | Surfactant additive | Evaporation loss in 1/16" units | | | Percent efficiency | |
|---|---|---|---|---|---|---|
| | | 7 days | 14 days | 21 days | 14 days | 21 days |
| None | | −13 | −25 | −38 | | |
| Do | | −14 | −27 | −40 | | |
| Film applied | A | −3 | −8 | −18 | 69.3 | 43.8 |
| Do | B | −5 | −13 | −23 | 50.0 | 41.0 |

These data show that the composition containing the polyisobutenyl succinic anhydride-tetraethylene pentamine reaction product showed efficiencies of 69.3 and 53.8% respectively in 14 and 21 days. These figures compare favorably with figures normally obtained for cetyl alcohol which are usually in the range of 20 to 30%. At a concentration of 1% the composition showed an effectiveness of 92.4 and 88.1% at 13 and 21 days respectively.

EXAMPLE 2

The following tests were performed outdoors using 10 ft. diameter wading pools with an initial depth of 2 ft. The surface active material employed in these tests was the A material employed in Example 1. The hydrocarbon oil and the wax were the same as employed in Example 1. In one example the wax was omitted. The water temperature and wet and dry bulb temperatures and relative humidity were noted for each day.

TABLE II.—ANTIEVAPORANT RESULTS ON 10-FOOT DIAMETER POOLS

| Pools | Treatment | | 1 day 7-16 | 2 days 7-17 | 3 days 7-18 | 4 days 7-19 | 7 days 7-22 | 9 days 7-24 | 11 days 7-26 | 16 days 7-31 | 18 days 8-2 | 21 days 8-5 | 26 days 8-9 |
|---|---|---|---|---|---|---|---|---|---|---|---|---|---|
| Control | None | Change in depth, 1/16 in. | Refilled | −2 | −7 | −12 | −24 | −39 | −39 | −56 | −64 | −70 | −73 |
| | | Water temperature, °F. | | 72.0 | 73.4 | 72.3 | 77.0 | 76.5 | 78.8 | 75 | 69.2 | 75.5 | 72 |
| Test 1 | 10% A, 90% oil, 1 g./ft.² | Change in depth, 1/16 in. | 0 | −1 | −1 | −1 | −4 | −9 | −16 | −32 | −38 | −46 | −55 |
| | | Water temperature, °F. | 79.2 | 80.8 | 83.2 | 82.8 | 85.5 | 83 | 81.4 | 75.4 | 70 | 75.0 | 72.5 |
| Test 2 | 10% A, 4% wax, 86% oil, 1 g./ft.² | Change in depth, 1/16 in. | 0 | 0 | 0 | 0 | −2 | −8 | −14 | −29 | −35 | −40 | −43 |
| | | Water temperature, °F. | 79.8 | 81.0 | 83.4 | 82.6 | 85.8 | 82 | 78.8 | 74.2 | 69.2 | 74.0 | 72 |
| Wet bulb temperature, °F | | | 61.5 | 59.5 | 59 | 58.5 | 65.5 | 61.6 | 67.5 | 60.5 | 52 | 60.5 | 65 |
| Dry bulb temperature, °F | | | 72 | 67.5 | 66.3 | 65.5 | 80.5 | 81.0 | 85.5 | 68 | 64 | 69.5 | 77 |
| Relative humidity, Percent | | | 55 | 62 | 65 | 66 | 44 | 32 | 39 | 62 | 43 | 59 | 58 |

As can be seen from the above data the omission of the wax from test No. 1, while resulting in some improvement in evaporation retardation over the control, was significantly less than the sample which included 4% wax.

In the following test employing the same materials, the concentration of the antievaporant was increased to 1 gram per sq. ft. In test 2 the surfactant material was omitted. This was significantly less efficient than the sample containing the surfactant in suppressing evaporation.

TABLE III.—ANTIEVAPORANT RESULTS ON OUTDOOR 10-FOOT DIAMETER POOLS

| Pools | Treatment | | 3 days | 4 days | 6 days |
|---|---|---|---|---|---|
| Control (center) | None | Change in depth, 1/16 in | −18 | −18 | −23 |
| | | Water temperature, °F | 77.0 | 77.0 | 69.0 |
| Test 1 | 10% X-22, 4% 140/142, 86% WO No. 5, 1 g./ft.² | Change in depth, 1/16 in | 0 | 0 | −2 |
| | | Water temperature, °F | 84.5 | 85.5 | 76.0 |
| Test 2 | 4% 140/142, 86% WO No. 5, 1 g./ft.² | Change in depth, 1/16 in | −8 | −10 | −14 |
| | | Water temperature, °F | 76.0 | 76.5 | 69.5 |

As shown by the test data, the antievaporant compositions of this invention significantly reduce loss of water when applied to the surface. As noted before, they may be applied by pouring on to the surface of water, by mixture with a hydrocarbon dispersing agent and pouring on to the surface, by dispersion as an emulsion, etc. They may also be applied continuously to the surface by various methods such as metering from a tank, etc. When they are dispersed by metering, the flow is adjusted to maintain the concentration of anti-evaporant on the surface within desired limits. For example, depending upon the prevailing wind conditions and thus the amount of wave action, it may be desirable to employ larger amounts of the material. Usually between 0.1 and 2.0 grams per sq. ft. are sufficient. Amounts of from 0.1 to 1.2 grams per sq. ft. are preferred.

I claim:
1. The method of suppressing the evaporation of water which comprises contacting the surface of the water with an antievaporant composition consisting essentially of from 70.0 to 99.4% by weight of the hydrocarbon oil boiling predominantly above about 500° F., from 0.5 to 10% by weight of a petroleum wax, and from 0.1 to 20% by weight of the surface active material selected from the group consisting of (a) alkenylsuccinic acids, (b) alkenylsuccinic anhydrides, and (c) the reaction product obtained by heating alkenylsuccinic anhydride with an amine, wherein the alkenyl group in each case contains from 30 to 200 carbon atoms.

2. The method of claim 1 wherein the surface active material is a reaction product of alkenylsuccinic anhydride containing approximately 65 carbon atoms in the alkenyl chain with at least 0.5 mole of tetraethylene pentamine.

3. As an antievaporant composition, a composition consisting essentially of from 70.0 to 99.4% by weight of the hydrocarbon oil boiling predominantly above about 500° F., from 0.5 to 10% by weight of a petroleum wax, and from 0.1 to 20% by weight of the surface active material selected from the group consisting of (a) alkenylsuccinic acids, (b) alkenylsuccinic anhydrides, and (c) the reaction product obtained by heating alkenylsuccinic anhydride with an amine, wherein the alkenyl group in each case contains from 30 to 200 carbon atoms.

4. The antievaporant composition of claim 3 wherein the surface active material is a reaction product of alkenylsuccinic anhydride containing approximately 65 carbon atoms in the alkenyl chain with at least 0.5 mole of tetraethylene pentamine.

References Cited

UNITED STATES PATENTS 3,004,987   10/1961   Paris et al. _____ 260—534 X
3,039,861   6/1962    Andress et. al. ____ 260—534 X
3,095,263   6/1963    Eckert et al. _____ 21—60.5

OTHER REFERENCES

Schwartz et al.: "Surface Active Agents and Detergents," vol. II, 1958, Interscience Publishers, Inc., New York, pp. 185–186.

MORRIS O. WOLK, Primary Examiner.

BARRY S. RICHMAN, Assistant Examiner.

U.S. Cl. X.R.

252—351, 356, 357, 384